(12) United States Patent
Shalom et al.

(10) Patent No.: US 7,326,906 B2
(45) Date of Patent: Feb. 5, 2008

(54) DIGITAL READOUT SYSTEM

(75) Inventors: Daniel Shalom, Rishon le Zion (IL);
Arie Shahar, Moshav Magshimim (IL);
Uri El-Hananay, Rehovot (IL); Allon Shani, Ramat Gan (IL); Alex Tsigelman, Petah-Tikva (IL)

(73) Assignee: Orbotech Medical Solutions Ltd., Yavne (IL)

( * ) Notice: Subject to any disclaimer, the term of this patent is extended or adjusted under 35 U.S.C. 154(b) by 88 days.

(21) Appl. No.: 11/446,772

(22) Filed: Jun. 3, 2006

(65) Prior Publication Data

US 2007/0278387 A1 Dec. 6, 2007

(51) Int. Cl.
*G01J 1/44* (2006.01)
*H01J 40/14* (2006.01)
*H03F 3/08* (2006.01)

(52) U.S. Cl. .................. 250/214 R; 348/302
(58) Field of Classification Search ............. 250/214.1, 250/214 R, 208.1; 327/514
See application file for complete search history.

(56) References Cited

U.S. PATENT DOCUMENTS

| | | | |
|---|---|---|---|
| 5,404,556 A * | 4/1995 | Mahowald et al. .......... 710/40 |
| 5,847,396 A | 12/1998 | Lingren et al. | |
| 6,333,648 B1 | 12/2001 | Tumer | |
| 6,784,932 B1 * | 8/2004 | Okamoto ................ 348/302 |
| 6,917,041 B2 | 7/2005 | Doty et al. | |

* cited by examiner

*Primary Examiner*—Georgia Epps
*Assistant Examiner*—Suezu Ellis
(74) *Attorney, Agent, or Firm*—Abelman, Frayne & Schwab (57) ABSTRACT

A readout system, including a data channel for conveying data, and detector units. Each detector unit includes an input which receives a pulse having a magnitude, a storage buffer which stores an indication of the magnitude, and output circuitry which outputs a request-to-read signal in response to the storage unit receiving the pulse. The units output the indications to the data channel upon receiving a select signal in response to the request-to-read signal. The system includes a processor, which receives the request-to-read signal, and in response transmits the select signal and reads the indication from the data channel. The system also includes selectors, coupled as a tree of hierarchical rows having decreasing numbers of selectors, which convey the request-to-read signals from the detector units to the processor. The selectors also convey the select signals from the processor to the detector units, thereby causing the processor to read the indications.

26 Claims, 4 Drawing Sheets

| TABLE I | | | | | | | |
|---|---|---|---|---|---|---|---|
| INPUTS | | | | OUTPUTS | | | |
| Rq1 | Rq2 | A | SEL | A | SEL 1 | SEL 2 | ADDR |
| 1 | 0 | X | ↑ | 0 | 1 | 0 | 0 |
| 0 | 1 | X | ↑ | 1 | 0 | 1 | 1 |
| 1 | 1 | 0 | ↑ | 1 | 0 | 1 | 1 |
| 1 | 1 | 1 | ↑ | 0 | 1 | 0 | 0 |
| X | X | X | 0 | A | 0 | 0 | 3 STT |

| TABLE II | | |
|---|---|---|
| INPUTS | | OUTPUT |
| Rq1 | Rq2 | REQ_OUT |
| 0 | 0 | 0 |
| 1 | 0 | 1 |
| 0 | 1 | 1 |
| 1 | 1 | 1 |

| TABLE III | | | |
|---|---|---|---|
| INPUTS | | | OUTPUT |
| Rq1 | Rq2 | A | D |
| 0 | 0 | X | 0 |
| 0 | 1 | X | 1 |
| 1 | 0 | 1 | 0 |
| 1 | 0 | 0 | 0 |
| 1 | 1 | 1 | 0 |
| 1 | 1 | 0 | 1 |

FIG. 4

DIGITAL READOUT SYSTEM

FIELD OF THE INVENTION

The present invention relates generally to signal detection, and specifically to a system for reading detectors of the signals.

BACKGROUND OF THE INVENTION

Arrays of detectors are used in imaging systems operating with high-energy photons, such as X-ray or y-ray cameras. Depending on its mode of operation, each detector of the array converts a detected photon, directly or indirectly, to a measurable electrical parameter, herein assumed to be a charge, which is a function of the energy of the detected photon. Typically, both the number of detected photons within a specific time period, and the energies of the detected photons, may be used to construct an image of the object generating the photons.

Once a detector has detected a photon, the detector is effectively disabled until the charge it generates has been read from the detector and the detector readout unit has been reset. Consequently, in the time period between charge generation and detector's readout unit reset, any photons incident on the detector are unread, so that in this time period the detector is unresponsive. Arrival of a photon at the detector during the unresponsive time period of the detector defines a first type of "simultaneous multiple-event." For systems having even relatively low photon rates, the loss of information caused by this type of simultaneous multiple-event, leading to unread events, may critically affect the final image produced.

In some applications, the detectors may be set to only require readout for a specific range of levels of the charge, so that photons outside a corresponding range of energies are not detected. This process may relax, at least somewhat, the requirement for a fast detector readout, but may cause problems at the occurrence of a second type of simultaneous multiple-events.

The second type of simultaneous multiple-event is different detectors requiring readout during overlapping time periods. These type of events typically occur when the energy of one photon is effectively shared by a number of detectors. Such sharing may occur if the charge generated by absorption of the photon is distributed over more than one detector. It may also occur if the photon energy itself is spread over more than one detector, such as may occur with Compton scattering. Adjusting the detector to only respond to a specific range of levels may thus mean that photons causing the second type of multiple event go undetected.

Thus, a detector typically requires a fast readout.

U.S. Pat. No. 5,847,396 to Lingren et al., whose disclosure is incorporated herein by reference, describes a photon imaging system which may be used as a gamma-ray camera. The system includes detection modules, each of which has a plurality of detection elements. A "fall-through" circuit is coupled to the detection elements of each module. The fall-through circuit automatically finds only those elements having a valid event, and having found such an event, the circuit searches for the next element having a valid event.

U.S. Pat. No. 6,333,648 to Tumer, whose disclosure is incorporated herein by reference, describes a multi-unit readout chip for nuclear applications. The chip has a number of operational modes, including a sparse readout mode in which only units having signals greater than a threshold value are readout. The sparse readout mode is claimed to increase data throughput.

U.S. Pat. No. 6,917,041 to Doty et al., whose disclosure is incorporated herein by reference, describes an event-driven charge coupled device (CCD). Charges from pixels in the device are loaded into a charge delay register, and an amplifier detects if a pixel charge level of the loaded charges are above a threshold. The amplifier controls the register, so that the charge on a pixel above the threshold, and charges on neighboring pixels, are steered into a first-in first-out (FIFO) register for later measurement. Charges in the register that do not require measurement are discarded.

However, notwithstanding existing systems, an improved method for reading imaging detectors would be advantageous.

SUMMARY OF THE INVENTION

In an embodiment of the present invention, a photon detector system comprises an array of similar photon detector units. Each detector unit has an amplifier which is able to hold an indication of a charge, generated by the unit receiving a photon, until the indication is read from the amplifier onto a readout line of the unit. The indication is typically an analog voltage level. Each detector unit outputs a request-to-read (request) signal when the amplifier has the indication, and is able to receive a select-to-read (select) signal and use it to cause the indication to be read from the amplifier. One readout amplifier is connected to all the readout lines of the array of units.

The array of units is coupled to a set of selectors, all substantially similar, which are connected together in the form of a tree. The tree is arranged in rows, each row having fewer selectors than a preceding row. Typically, each row has half the number of selectors of the preceding row. A final row of the tree consists of one final selector. A request signal from a unit having the indication is routed forward through the tree by the selectors to the final selector, and from there to a processor. The processor generates a select signal that is routed back, via the same selectors, to the unit originating the request signal. In addition, on receipt of the request signal, the processor activates the readout amplifier, so that the indication on the originating unit is read by the processor. Coupling the units to selectors which are arranged in the form of a tree, and which are able to route signals through the tree forward and back along the same path, forms an event-driven unit readout system having an extremely fast readout time.

In addition to being configured to route the select signal along the same path as the request signal, the selectors are also configured to retain other request signals, and to forward these signals to the final selector as, and when following selectors are free, i.e., are not transferring another request signal or a select signal. Combined with the event-driven system described above, the added ability of the selectors to effectively queue request signals by acting as memory elements substantially increases the utility of the system.

The selectors are configured to prioritize request signals, so as to ensure that detector units are read equitably. The prioritization is accomplished by the selectors recording which units have been most recently read. For example, if a unit A is read, a selector records the reading. If in a later time period unit A and a unit B both request reading, the selector uses the record that unit A was recently read to ensure that unit B is read before unit A.

In some embodiments of the present invention, each of the detector units is assigned a binary address. The selectors are configured to toggle address lines connected to the selectors on or off as the selector transfers the select signal, so automatically registering the address of the originating detector unit. Thus, as each detector unit is read out, its address is available.

There is therefore provided, according to an embodiment of the present invention, a readout system, including:

a data channel for conveying data;

a first plurality of detector units, each detector unit comprising:

an input which is arranged to receive a pulse having a magnitude;

a storage buffer which is arranged to store an indication of the magnitude; and output circuitry which is coupled to output a request-to-read signal in response to the storage unit receiving the pulse, and to output the indication to the data channel upon receiving a select signal in response to the request-to-read signal;

a processor, which is coupled to receive the request-to-read signal and in response transmit the select signal, and which is coupled to read the indication from the data channel; and a second plurality of selectors, which are coupled as a tree of hierarchical rows comprising decreasing numbers of selectors, and which are arranged to convey the request-to-read signal from the detector unit to the processor, and to convey the select signal from the processor to the detector unit, thereby causing the processor to read the indication.

Typically, a subset of the selectors form a path between the hierarchical rows followed by the request-to-read signal and the select signal follows the path.

In an embodiment, the second-plurality of selectors, in response to the select signal, determine an address of the unit, a given row of the hierarchical rows is coupled to generate a binary significant value for the address, and a position of the binary significant value within the address is determined by a hierarchical level of the given row.

Typically, each of the selectors is coupled to store the request-to-read signal until receipt by the selector of the select signal.

In one embodiment a given selector chosen from the selectors is coupled to receive and store a first request-to-read signal from a first detector unit chosen from the detector units, and to receive and store a second request-to-read signal from a second detector unit chosen from the detector units. The given selector stores the first request-to-read signal until receipt by the given selector of the select signal, and the given selector stores the second request-to-read signal until receipt by the given selector of a subsequent select signal.

In a disclosed embodiment the second plurality of selectors are coupled to receive and store two or more request-to-read signals from respective two or more detector units having respective two or more indications stored therein. The processor receives the two or more request-to-read signals and in response transmits respective two or more select signals via the second plurality of selectors to the respective two or more detector units, thereby causing the processor to read the respective two or more indications.

In some embodiments the second plurality of selectors are configured to assign a priority to the request-to-read signal. The priority is operative so that if a first detector unit issues a first request-to-read signal in an initial time period, and a second detector unit and the first detector unit issue respective second request-to-read signals in a later time period, the second plurality of selectors direct the select signals so that in the later time period the second detector unit is read before the first detector unit.

There is further provided, according to an embodiment of the present invention, a method for reading out data, including:

providing a first plurality of detector units, each detector unit including:

an input which is arranged to receive a pulse having a magnitude;

a storage buffer which is arranged to store an indication of the magnitude; and output circuitry which is coupled to output a request-to-read signal in response to the storage unit receiving the pulse, and to output the indication to a data channel upon receiving a select signal in response to the request-to-read signal;

coupling a second plurality of selectors as a tree of hierarchical rows including decreasing numbers of selectors, the selectors being arranged to convey the request-to-read signal from the detector unit and to convey the select signal to the detector unit thereby causing the indication to be placed on the data channel; and reading the indication from the data channel.

Typically, the second plurality of selectors are coupled to receive and store two or more request-to-read signals from respective two or more detector units having respective two or more indications stored therein, and the method includes receiving the two or more request-to-read signals and in response transmitting respective two or more select signals via the second plurality of selectors to the respective two or more detector units, thereby causing reading of the respective two or more indications.

The present invention will be more fully understood from the following detailed description of the embodiments thereof, taken together with the drawings, a brief description of which follows.

DETAILED DESCRIPTION OF EMBODIMENTS

Figure 1:
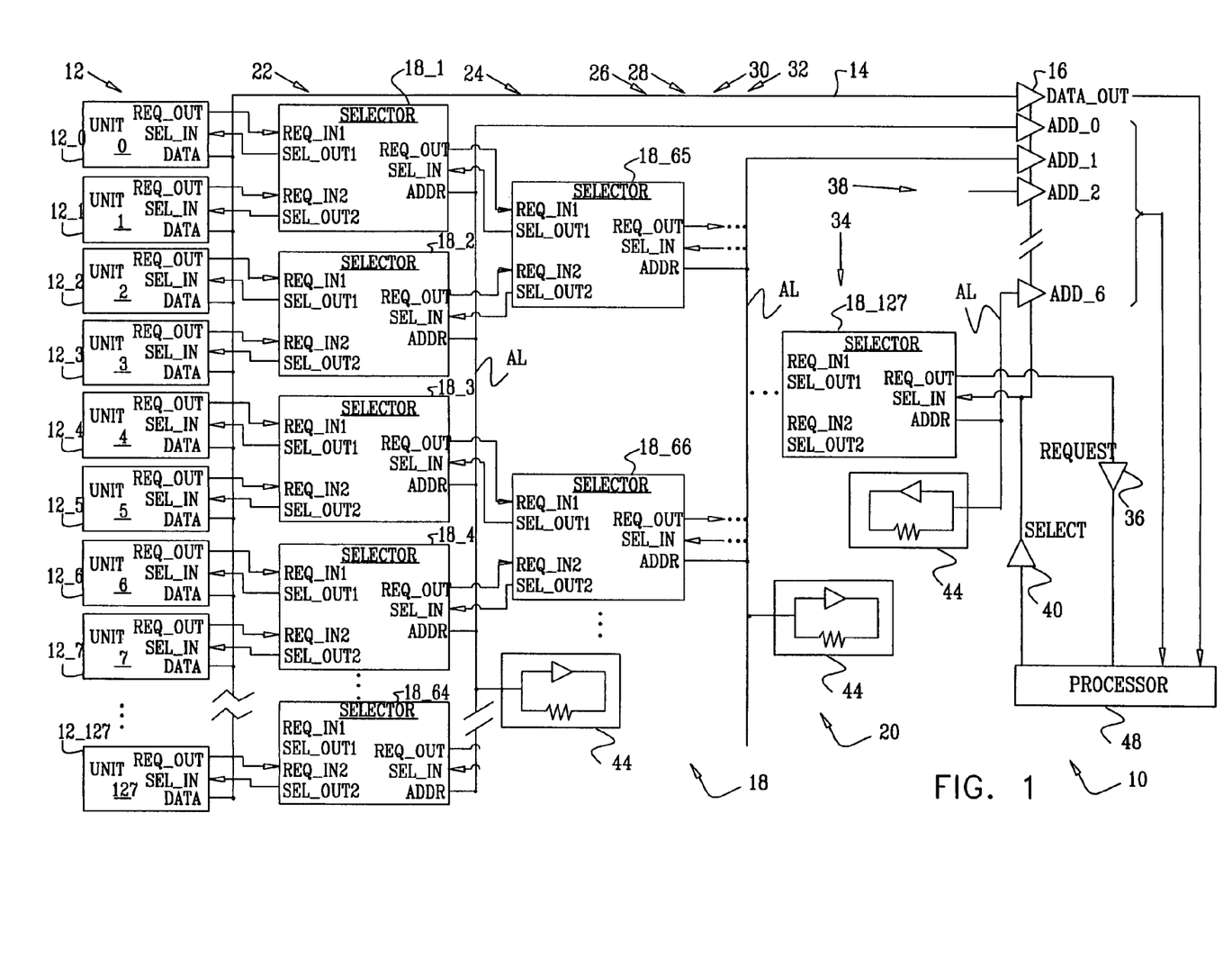
FIG. 1 is a schematic block diagram of a digital readout system for detecting radiation, according to an embodiment of the present invention.

Reference is now made to FIG. 1, which is a schematic block diagram of a digital readout system 10 for detecting radiation, according to an embodiment of the present invention. System 10 comprises a multiplicity of detector units 12, herein also referred to as units and assumed by way of example to comprise 128 units. However, it will be appreciated that the number of units in system 10 may be any convenient whole number equal to or greater than two. In the specification the units are referred to generically as units 12, and specifically as unit n or unit 12_$n$, where n is an integer from 0 to 127.

As explained in more detail below, each unit 12 detects single photons, outputting a detected signal on a data channel 14, typically a bus line. The detected signal is transferred to a processor 48 via a readout amplifier 16. Processor 48 may comprise a field programmable gate array (FPGA), and/or any other convenient processor such as an industry-standard computing unit. Units 12 are connected to an array of substantially similar selectors 18, the array being configured as a tree 20. Tree 20, as is described below, acts to coordinate request signals from units 12 indicating that they have data that requires reading. Each unit 12 that requires reading is configured to provide its read out on receipt of a select signal. Tree 20 also acts to coordinate the select signals. The tree of selectors provides a number of advantages to system 10:

There are no collisions as units are read. The tree arrangement automatically queues units requesting reading at the same time.

Only units requiring reading are read, so that the system is an event-driven system.

The tree arrangement ensures that there is an extremely short time between a unit requesting that it be read, and receiving a select signal.

Each pair of units 12 is connected to one selector 18, shown in FIG. 1 as being in a row 22. Each pair of selectors 18 in row 22 is connected to a further selector 18, in a row 24. Thus, the number of selectors in row 24 is half that in row 22. Further selectors 18 are connected in a substantially similar manner, in rows 26, 28, 30, 32, concluding with a single selector 18 in a final row 34. (For clarity, selectors 18 in rows 26, 28, 30, 32 are not shown in FIG. 1.) For the 128 units 12 of system 10, there are thus 64 selectors in row 22, 32 selectors in row 24, 16 selectors in row 26, 8 selectors in row 28, 4 selectors in row 30, and 2 selectors in row 32, so that there are a total of 127 selectors 18 in tree 20. In the description herein, selectors 18 are separately identified, as necessary, as selector 18_$n$, where n is a postscript identifier from 1 to 127. Thus row 22 comprises selectors 18_1 to 18_64; row 24 comprises selectors 18_65 to 18_96; row 26 comprises selectors 18_97 to 18_112; row 28 comprises selectors 18_113 to 18_120; row 30 comprises selectors 18_121 to 18_124; row 32 comprises selectors 18_125 and 18_126; and final row 34 has selector 18_127. Each row of selectors 18 is connected to a respective address line AL, which in turn is connected to a gate. Each address line AL typically has a level holder 44 that holds the value of line AL when no units 12_$n$ are selected. Thus, address line AL of row 22 provides a least significant value for an address to an address gate ADD_0. The address lines AL of rows 24, 26, 28, 30, 32, and 34 respectively provide higher significant values to address gates ADD_1, ADD_2, and ADD_6. Gates ADD_0, ADD_1, ..., and ADD_6 are also referred to herein as gates 38.

It will be appreciated that the rows of selectors 18 of tree 20 are arranged hierarchically, each row, apart from the first and the last rows, generating an address value that is more significant than a preceding row, and less significant than a following row. The first row is hierarchically at the lowest level, generating the least significant address value; the last row is hierarchically at the highest level, generating the most significant address value.

Figure 2:
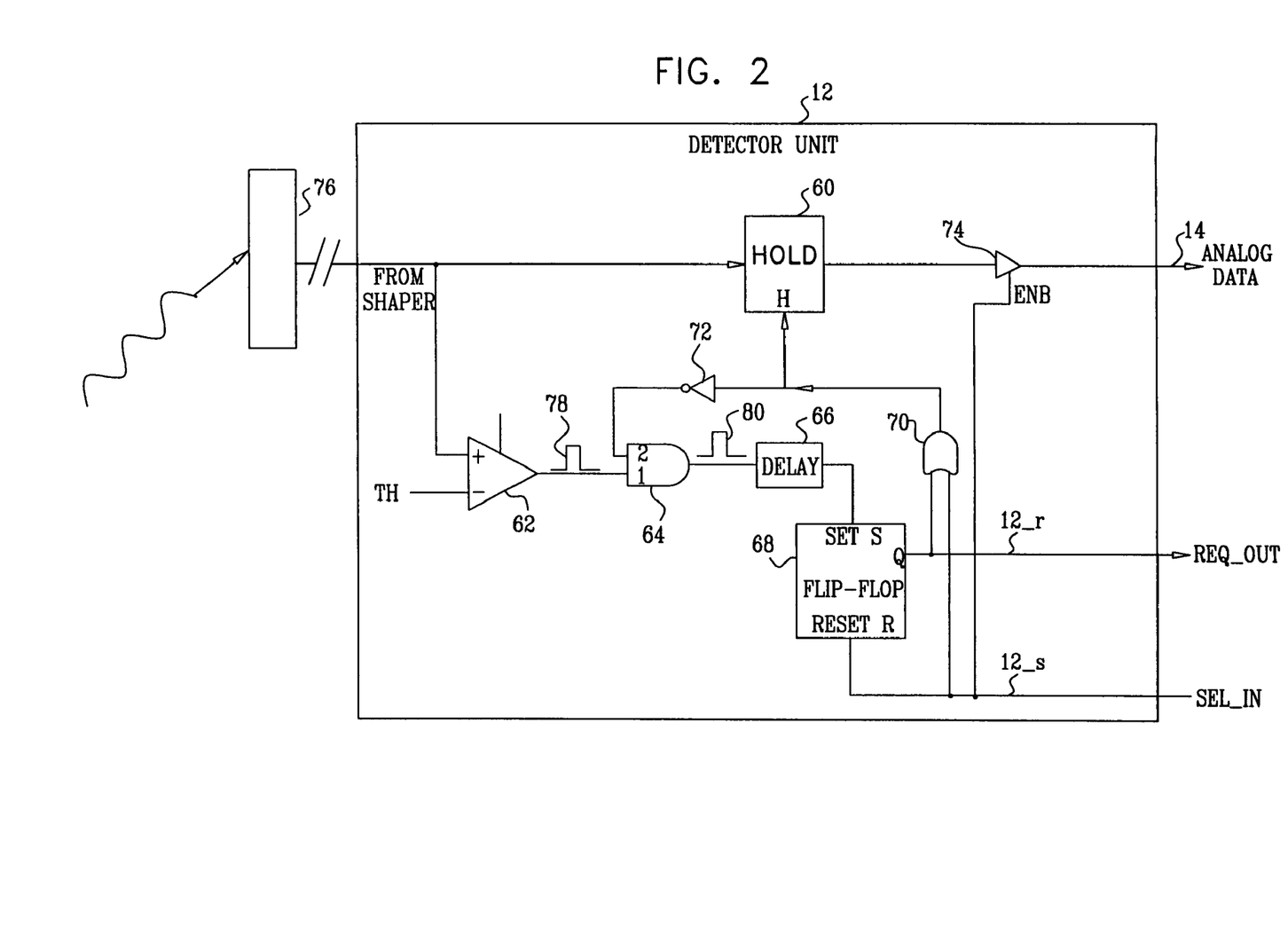
FIG. 2 is a schematic block diagram of a detector unit of the system of FIG. 1, according to an embodiment of the present invention.

FIG. 2 is a schematic block diagram of unit 12, according to an embodiment of the present invention. Each unit 12 acts as a detector of photons, typically high energy photons from an X-ray or y-ray source, which are incident on a photon detecting element 76. Element 76 typically comprises a semiconductor, and herein, by way of example, is assumed to comprise Cadmium Zinc Telluride (CZT). The semiconductor absorbs the photon and in doing so generates a burst of electron-hole pairs which in turn produce a charge. The charge produces a signal, herein also termed a charge indication or an indication, which is transferred to a signal holding unit 60, typically via a shaper, not shown in the diagram, which acts to filter the signal. Holding unit 60 acts as a storage buffer for the indication, which is herein assumed to be, by way of example, an analog voltage level. A comparator 62 also receives the signal and compares a level of the signal with a preset threshold voltage TH.

If the signal voltage is greater than TH, comparator 62 outputs a pulse 78, herein assumed to be a logic level 1 pulse, indicating that a signal has been stored on unit 60. Pulse 78 is input to a first input of an AND gate 64.

In an initial state of unit 12, an output request line 12_$r$ and an input select line 12_$s$ are both assumed to be at logic level 0. The two lines are connected to an OR gate 70, so that in the initial state the OR gate output is logic 0. Thus, the output of an inverter 72, connected to a second input of AND gate 64, is logic 1.

Pulse 78 causes AND gate 64 to change its initial state output logic 0 to logic 1, so that the gate outputs a logic level 1 pulse 80, corresponding to the pulse generated by comparator 62. Pulse 80 is transferred via a delay 66 to an S input of a non-clocked flip-flop 68. An R input of the flip-flop is coupled to input select line 12_$s$, which, as stated above, is at state 0. Pulse 80 thus causes the output Q of the flip-flop, coupled to request line 12_$r$, to change from its initial state 0 to a request level, logic state 1. Request line 12_$r$ remains at this level until flip-flop 68 is reset. While at the request level, request line 12_$r$ is assumed to have a "Request_out" signal.

The change of the flip-flop output causes OR gate 70 output to change to a logic state 1, which sets holding unit 60, via its input terminal H, into its hold state. The delay length of delay 66 is adjusted prior to operation of system 10 so that the hold state of unit 60 occurs at a required time after the shaper sends its charge to the unit.

The change in output of the OR gate to a logic state 1 causes the second input of AND gate 64 to move to a level 0, because of the presence of inverter 72. Until there is a further change in the level at the second input of the AND gate, the AND gate effectively ignores any further pulses 78 that may be transmitted by comparator 10. Flip-flop 68 thus causes its unit 12 to act as a memory for the data in holding unit 60.

A change in level at the second input of the AND gate is caused by arrival of a pulse, herein termed a "Select_in" signal, on select line 12_$s$. Select_in is a level 1 pulse having a rising edge, from level 0 to level 1, and a falling edge from level 1 to level 0. The rising edge of the Select_in signal changes the output Q of the flip-flop to 0, which in turn changes the output of OR gate 70 to 1, and the second input of the AND gate to 0, so that the gate continues to ignore any pulses 78. The level 1 of Select_in enables a readout gate 74, causing the charge indication on holding unit 60 to be read into data line 14 (FIG. 1).

At a time after the indication on holding unit 60 has been read out, as explained below, the level of Select_in reverts to 0 at the falling edge of Select_in. This causes the second input to the AND gate to become 1, so that the unit returns to its initial state and is able to respond to pulses 78.

Figure 3:
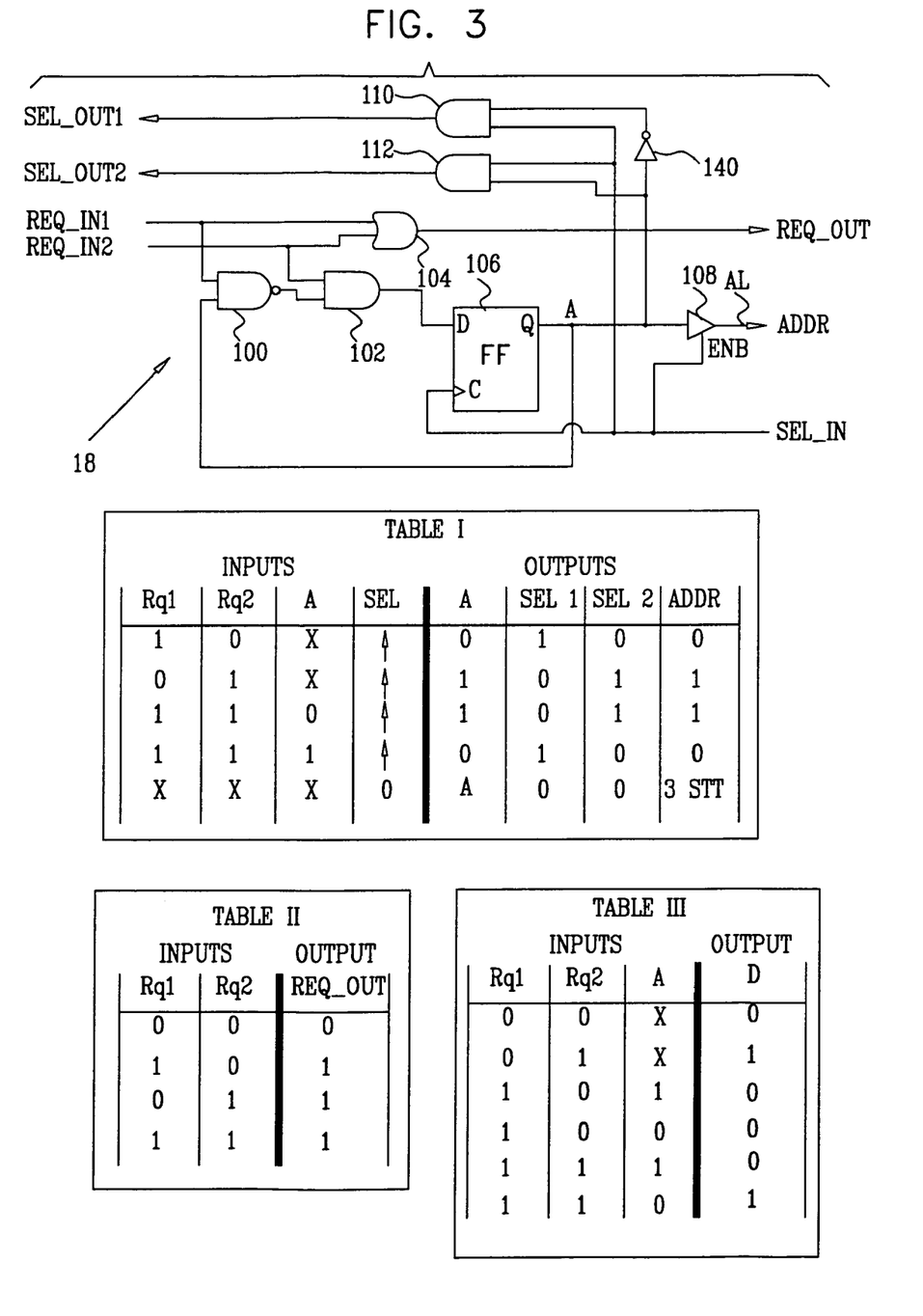
FIG. 3 is a schematic block diagram of a selector in the system of FIG. 1, and three truth tables for the selector, according to an embodiment of the present invention.

FIG. 3 is a schematic block diagram of selector 18 and three truth tables for the selector, according to an embodiment of the present invention. Selector 18 has three inputs: two request signals, "Request_in_1," "Request_in_2," and a select signal substantially the same as Select_in of unit 12. The selector has four outputs: two select outputs, "Select_out_1" and "Select_out_2," an address output "Addr," and a request output substantially the same as Request_out of unit 12.

Truth table I shows the overall inputs and outputs for selector 18. Table I also shows values of an internal level, A, of selector 18 before and after arrival at the selector of input signal Select_in.

Truth table II shows the output request signal generated by either input request signals, and is the truth table for an OR gate 104 of the selector. The last line of truth table I summarizes the four possible inputs of table II, and their effect, in the absence of a select input.

Truth table III shows values of inputs Request_in_1, Request_in_2, internal level A, and an output D that is applied to a D terminal of a flip-flop 106 of the selector. Flip-flop 106 also has a terminal Q; terminals D and Q may be at levels 0 or 1.

The select input Select_in is connected to flip-flop 106. The rising edge of Select_in acts as a clocking signal for the flip-flop, so that, on receipt of Select_in, the level value on D transfers to Q.

The results of receiving the Select_in signal are shown in table I, and the lines of the table are described in the following paragraphs.

In a first line, if Request_in_1 is at level 1 and Request_in 2 is at level 0, then analysis of NAND gate 100 and AND gate 102 shows that terminal D is at level 0. (This is shown in lines 3 and 4 of table III.) As shown in table I, regardless of the initial state of A, the Select_in rising edge operates to make the final state of A level 0.

In a second line of table I, if Request_in_1 is at level 0 and Request_in_2 is at level 1, then analysis of the NAND and AND gates shows that terminal D is at level 1. (This is shown in line 2 of table III.) The Select_in rising edge makes the final state of A level 1.

The third and fourth lines of table I show the results if Request_in_1 and Request_in_2 are both at level 1. In this case analysis of the NAND and AND gates shows that when A is at level 0 terminal D is at level 1; when A is at level 1, terminal D is at level 0, as shown in lines 5 and 6 of table III. As shown in the third and fourth lines of table I, the Select_in rising edge toggles the value of A.

The Select_out_1 and Select_out_2 signals are outputs of AND gates 110 and 112 respectively, and their output values depend on the value of A when the Select_in signal is received. Analysis of the AND gates, and of inverter 140, shows that when A is at level 0, Select_out_1 is at level 1 and Select_out_2 is at level 0; when A is at level 1, Select_out_1 is at level 0 and Select_out_2 is at level 1.

A gate 108 having a three-state output is enabled by the Select_in signal, and when enabled the gate transfers the value of A to an address line AL. When not enabled, gate 108 has a high impedance, so that line AL may be level 0 or level 1.

It will be appreciated that the tree arrangement of selectors 18 means that OR gates 104 are equivalent to one OR gate having 128 inputs, corresponding to the 128 units of system 10. Thus, as long as there is at least one. Request_out from a unit, the Request_out from selector 18_127 is high.

Figure 4:
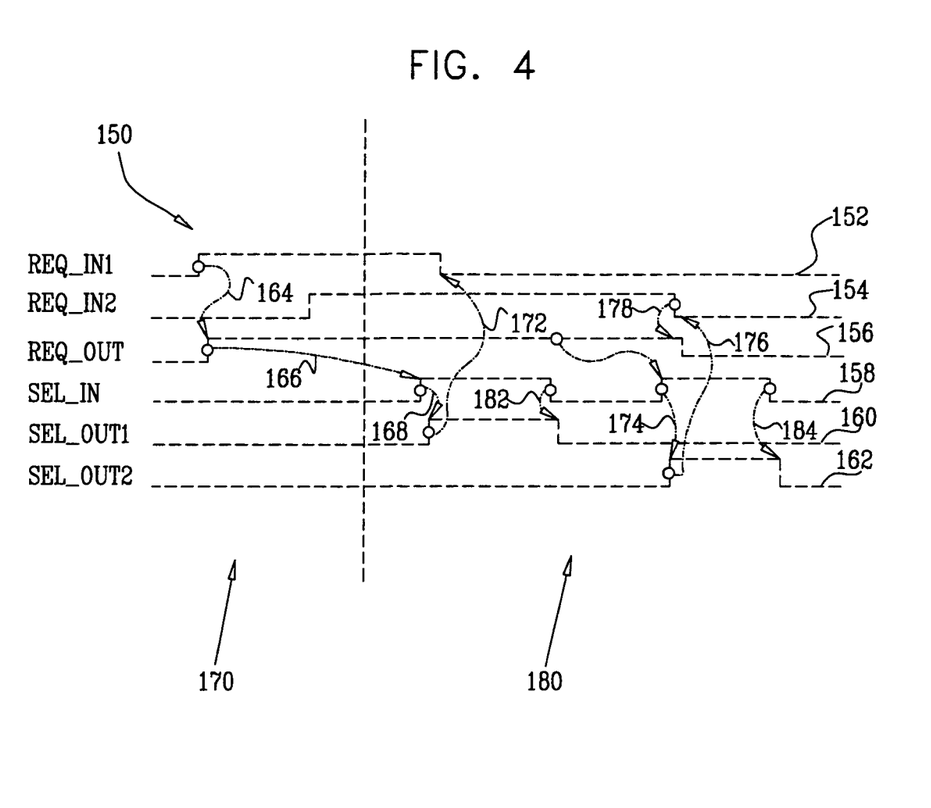
FIG. 4 is a schematic timing diagram for the selector of FIG. 3, according to an embodiment of the present invention.

FIG. 4 is a schematic timing diagram 150 for selector 18, according to an embodiment of the present invention. A first section 170 of the diagram illustrates the behavior of a selector 18 on receiving input request signals, and a second section 180 corresponds to the behavior of the selector on receipt of a select input signal. As described below, the timing lines of diagram 150 also apply to the operation of units 12.

The operation of system 10 is exemplified by assuming that after an initial state during which system 10 does not detect photons, unit 12_4 and unit 12_7 (FIG. 1) each detect a photon. In the example described herein, diagram 150 is used to explain the operation of different units 12 and different selectors 18, as appropriate.

Considering selector 18_3, the detection of a photon by unit 12_4 causes the unit to generate a Request_out signal, which is fed to selector 18_3 as Request_in_1, as shown in a timing line 152. Request_in_1 causes the selector to generate a Request_out signal, as shown by broken line 164 connecting to a request timing line 156. This corresponds to line 2 of table II (FIG. 3). In flip-flop 106, the state of terminal D for selector 183 remains at level 0, as shown in line 4 of table III. The value of A for the selector remains at level 0.

Considering selector 18_4, as shown in a timing line 154, a Request_out signal, from unit 12_7 is fed to selector 18_4 as a level 1 Request_in_2. In selector 18_4, Request_in_2 also causes the selector to generate a Request_out signal, not shown in diagram 150. As shown in line 2 of table III the state of terminal D of flip-flop 106 in selector 18_4 becomes 1. The value of A for the selector remains at level 0.

The Request_out signals from selectors 18_3 and 18_4 are respectively Request_in_1 and Request_in_2 for selector 18_66, so that both these input request signals are set at level 1. Using the same type of analysis as described above, it will be seen that selector 18_66 generates a Request_out signal, corresponding to timing line 156 in section 170. After generating the Request_out signal, A for selector 18_66 is at level 0, since no select signal has been received, and terminal D of the selector is at level 1 corresponding to line 6 of table III.

The Request_out signal from selector 18_66 propagates via selectors 18_97, 18_113, 18_121, 18_125, to final selector 18_127. Since the incoming request for selector 18_97 is Request_in_2 at level 1, after outputting its Request_out, selector 18_97 has A at level 0 and its terminal D at level 1. Selectors 18_113, 18_121, 18_125, and 18_127 all have A at level 0 and their respective terminals D at level 0, since their incoming requests are Request_in_1.

The Request_out from selector 18_127 is fed via a gate 36 to processor 48 (FIG. 1). Processor 48 returns a first Select_in signal via a gate 40 to selector 18_127, corresponding to broken line 166 leading to timing line 158 in second section 180. The Select_in signal also enables readout amplifier 16, as well as address gates 38 of system 10. As described in more detail below, Select_in propagates in reverse via exactly the same selectors 18 as the Request_out signals propagate.

For each of selectors 18_127, 18_125, 18_121, and 18_113, line 1 of table I applies, so that each selector outputs a Select_out_1 signal on receipt of the rising edge of Select_in. This is shown as a broken line 168. Line 1 of table I shows that for all these selectors A is 0 after the rising edge has been received. D is also 0 since there has been no change in levels of Request_in_1 or Request_in_2. The incoming Select_in signal for these selectors also enables gates 108 of the selectors, so that ADD_6, ADD_5, ADD_4, and ADD_3 are set at level 0.

Selector 18_97 receives the Select_out_1 signal from selector 18_113 as its Select_in signal. As stated above, selector 18_97 has Request_in 2 at level 1, A at level 0 and its terminal D at level 1. Line 2 of table I therefore applies, so that after the rising edge of Select_in, A toggles to 1, selector 18_97 outputs Select_out_2 to selector 18_66, and gate 108 is enabled setting ADD_2 at level 1.

Selector 18_66 has A at level 0, D at level 1, and Request_in_1 and Request_in_2 at level 1, so that on receipt of the rising edge of Select_in, line 3 of table I applies. A toggles to level 1, selector 18_66 outputs Select_out_2 to selector 18_4, and gate 108 is enabled setting ADD_1 at level 1.

Selector 18_4 has A at level 0, D at level 1, Request_in_2 at level 1 and Request_in_1 at level 0, so that on receipt of the rising edge of Select_in, line 2 of table I applies. A toggles to level 1, selector 18_4 outputs Select_out_2 to unit 7, corresponding to broken line 174, and gate 108 is enabled setting ADD_0 at level 1. Thus, the binary address supplied to processor 48 is 0000111, corresponding to unit 7.

Unit 7 receives Select_in on its select line 12_s. As described above with reference to FIG. 2, the rising edge of Select_in changes the output Q of flip-flop 68 (FIG. 2) to 0 so that Request_in_2 and Request_out of selector 18_4 change to 0, as shown by broken lines 176 and 178. The Request_out changes propagate through the OR gate 104 of selector 184, so that the Request_out level changes to 0. However, the Request_out level for selectors 18_97, 18_113, 18_121, 18_125, and final selector 18_127 remain at 1, since unit 4 and selector 18_3 still have Request_out levels of 1.

Select_in to unit 7 also enables gate 74 of the unit, so that the data on holding unit 60 is placed on data line 14, for reading via amplifier 16 by processor 48.

Once processor 48 has read the data on line 14, it lowers the Select_in level into selector 18_127 to 0. As will be understood from line 5 of table I, this has the effect of setting all the Select_in levels of selectors 18 to level 0 and disabling their address gates 108, effectively readying system 10 for reading a new address. The reset is illustrated by broken lines 178 and 184. Select_in moving to 0 also has the effect of setting terminal H of holding unit 60 to 0, for those selectors which do not have a Request_out at level 1. Thus, terminal H of unit 7 is set to 0, but terminal H of unit 4 remains at 1.

After lowering the Select_in level to 0, processor 48 checks to see if Request_in from gate 36 is still at 1. If it is, then it indicates there is still a unit to be read. If Request_in from gate 36 is 0, then no units are waiting to be read.

In the specific example considered here, after unit 7 has been read, processor 48 determines that Request_in from gate 36 is at 1, and so processor 48 generates a second Select_in level 1 signal via gate 40 to selector 18_127.

The second Select_in signal has similar effects to those described above for the first Select_in signal. Thus the second Select_in signal propagates via selectors 18_127, 18_125, 18_121, 18_113, 18_97 to selector 18_66, and sets ADD_6, ADD_5, ADD_4, and ADD_3 to level 0, and ADD_2 to level 1. However, at selector 18_66, the Select_in signal is routed, using two Select_out_1 signals, via selector 18_3 to unit 4. This also sets ADD_1 and ADD_0 to be 0.

When the Select_out_1 signal reaches unit 4, the unit places its data on line 14, substantially as described above for unit 7, and processor 48 reads the data, as well as binary address 000100 of the unit.

Once processor 48 has read the data from line 14, it lowers the second Select_in level to 0. The level change propagates through all selectors 18, after which processor 48 checks to see if Request_out from gate 36 is at level 1. Since unit 4 has been read, its request_out is at 0, and so the Request_out from gate 36 is also at level 0. Processor 48 thus ceases to send Select_in signals, and remains in this quiescent state until one of units 12 sends a Request_out.

The path of selectors followed by the Request_out from unit 4 is a subset of selectors 18: selectors 18_3, 18_66, 18_97, 18_113, 18_121, 18_125, and selector 18_127. The Select_in signal to unit 4 follows exactly the same path in reverse, i.e. selectors 18_127, 18_125, 18_121, 18_113, 18_97, 18_66 and 18_3. As is also illustrated by the path followed by the Request_out and Select_in signals for unit 7, the characteristic of identical forward and reverse signal paths is true for all units.

The example above illustrates how selectors 18 act to receive and store Request_out signals from two units 12. In response to the stored Request_out signals, processor 48 reads each unit 12 sequentially and its Request_out signal is cancelled. It will be appreciated from consideration of the example above that selectors 18 may act to receive and store Request_out signals from any number of units 12, i.e., in system 10, up to 128 units 12, each of which units may generate a Request_out signal. As for the example above, processor 48 sequentially reads each unit 12 that has generated a Request_out signal, and each stored Request_out signal is cancelled after the unit has been read. The reading of units 12, and canceling of respective stored Request_out signals, continues until all the units generating Request_out signals have been read.

In addition to storing Request_out signals from detector units 12, selectors 18 prioritize how the detector units are read out. The following example explains how the prioritization operates.

Returning to FIG. 1, assume that from an initial state in which no units 12 have been read unit 2 generates an initial Request_out signal. The initial Request_out signal from unit 2 is cancelled by the unit being read out by an initial select_in signal. Assume that in a later time period both unit 2 and unit 3 generate Request_out signals, herein described as later Request_out signals. The later Request_out signals are cancelled by later select_in signals.

The initial and later Request_out and select_in signals all pass through selector 18_2. Table I (FIG. 3) illustrates the effect of each of the signals in selector. 18_2.

Line 1 of table I shows that on receipt of the initial select_in signal (generated by processor 48 in response to the initial Request_out signal, shown as Rq1=1) the value of A is set to 0 and a select_out_1 signal (SEL 1) is generated. The select_out_1 signal is transmitted to unit_2, allowing processor 48 to read the unit.

In the later time period, when the first of the later select_in signals is received, Rq1=Rq2=1, because of the two later Request_out signals. At this time the value of A is 0, as explained above. Thus line 3 of table I applies. As shown in the outputs of line 3, a select_out_2 signal (SEL 2) is generated. The select_out_1 signal is transmitted to unit 3 so that the processor reads the unit.

The second of the later select_in signals generates a select_out_1 signal (SEL 1), as shown in line 2 of table I, so that unit 2 is read.

Thus, the fact that unit 2 was initially read causes its priority to be lowered when unit 2 and unit 3 both request reading in a later time period. Consequently, in the later time period unit 3 is read before unit 2.

If, rather than unit 2 requesting to be read initially, unit 3 had requested initial reading, then the same type of analysis as given above shows that when both unit 2 and unit 3 request reading in a later time period, unit 3 is lowered in priority. In this case, in the later time period unit 2 is read before unit 3.

The analysis of the example above may be generalized to all selectors 18. Those skilled in the art will appreciate that applying the analysis to all the selectors shows that the selectors act to prioritize action on read request signals over all system 10, ensuring that the order upon which the signals from all units 12 are acted upon is equitable.

As is illustrated in FIG. 1, the number of selectors traversed by each signal, from a unit to processor 48, and from the processor to the unit, is equal to the number of rows of selectors i.e., for system 10, seven selectors 18. In general, for N units, where N is an integral power of 2, the number of selectors traversed is equal to $\log_2 N$. Since the number of selectors traversed influences the response time of the system, it will be understood that the response of system 10 is significantly faster than prior art systems having N units using a cyclic readout method. The increase in response is of the order of $$\frac{N}{\log_2 N}.$$

System 10 uses one processor coupled via selectors 18 to 128 units. It will be appreciated that multiple systems such as those of system 10 may be connected in parallel. For example, two systems, each substantially the same as system 10, may be connected to 256 units, the two systems using two processors in total. Alternatively, the 256 units may be connected, via eight rows of selectors, to one processor. Further alternatively, four systems, each system having 64 units, six rows of selectors, and one processor, may be used. Other similar arrangements, or combinations of such arrangements, will be apparent to those skilled in the art.

It will also be appreciated that the number of units is not limited to integral powers of 2. Thus the 127 selectors of system 10 may be connected to less than 128 units, in which case some of the selectors will be under-utilized, or may not even be used at all. Alternatively, the number of selectors may be optimized for the number of units, maintaining the hierarchical tree arrangement exemplified in system 10. For example, for 112 or 111 units, selectors 18 may be arranged in seven rows having 56, 28, 14, 7, 4, 2, and 1 selectors.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A readout system, comprising:
    a data channel for conveying data;
    a first plurality of detector units, each detector unit comprising:
        an input which is arranged to receive a pulse having a magnitude;
        a storage buffer which is arranged to store an indication of the magnitude; and
        output circuitry which is coupled to output a request-to-read signal in response to the storage buffer receiving the pulse, and to output the indication to the data channel upon receiving a select signal in response to the request-to-read signal;
    a processor, which is coupled to receive the request-to-read signal and in response transmit the select signal, and which is coupled to read the indication from the data channel; and
    a plurality of selectors, which are coupled as a tree of hierarchical rows comprising decreasing numbers of selectors, and which are arranged to convey the request-to-read signal from the detector unit to the processor, and to convey the select signal from the processor to the detector unit, thereby causing the processor to read the indication.

2. The system according to claim 1, wherein a subset of the selectors form a path between the hierarchical rows followed by the request-to-read signal and wherein the select signal follows the path.

3. The system according to claim 1, wherein the plurality of selectors, in response to the select signal, determine an address of the unit.

4. The system according to claim 3, wherein a given row of the hierarchical rows is coupled to generate a binary significant value for the address.

5. The system according to claim 4, wherein a position of the binary significant value within the address is determined by a hierarchical level of the given row.

6. The system according to claim 1, wherein each of the selectors is coupled to store the request-to-read signal until receipt by the selector of the select signal.

7. The system according to claim 1, wherein a given selector chosen from the selectors is coupled to receive and store a first request-to-read signal from a first detector unit chosen from the detector units, and to receive and store a second request-to-read signal from a second detector unit chosen from the detector units.

8. The system according to claim 7, wherein the given selector stores the first request-to-read signal until receipt by the given selector of the select signal.

9. The system according to claim 8, wherein the given selector stores the second request-to-read signal until receipt by the given selector of a subsequent select signal.

10. The system according to claim 1, wherein the plurality of selectors are coupled to receive and store two or more request-to-read signals from respective two or more detector units having respective two or more indications stored therein.

11. The system according to claim 10, wherein the processor receives the two or more request-to-read signals and in response transmits respective two or more select signals via the plurality of selectors to the respective two or more detector units, thereby causing the processor to read the respective two or more indications.

12. The system according to claim 1, wherein the plurality of selectors are configured to assign a priority to the request-to-read signal.

13. The system according to claim 12, wherein the priority is operative so that if a first detector unit issues a first request-to-read signal in an initial time period, and a second detector unit and the first detector unit issue respective second request-to-read signals in a later time period, the plurality of selectors direct the select signals so that in the later time period the second detector unit is read before the first detector unit.

14. A method for reading out data, comprising:
    providing a first plurality of detector units, each detector unit comprising:
        an input which is arranged to receive a pulse having a magnitude;

a storage buffer which is arranged to store an indication of the magnitude; and output circuitry which is coupled to output a request-to-read signal in response to the storage buffer receiving the pulse, and to output the indication to a data channel upon receiving a select signal in response to the request-to-read signal;

coupling a plurality of selectors as a tree of hierarchical rows comprising decreasing numbers of selectors, the selectors being arranged to convey the request-to-read signal from the detector unit and to convey the select signal to the detector unit thereby causing the indication to be placed on the data channel; and reading the indication from the data channel.

15. The method according to claim 14, wherein a subset of the selectors form a path between the hierarchical rows followed by the request-to-read signal and wherein the select signal follows the path.

16. The method according to claim 14, wherein the plurality of selectors, in response to the select signal, determine an address of the unit.

17. The method according to claim 16, wherein a given row of the hierarchical rows is coupled to generate a binary significant value for the address.

18. The method according to claim 17, wherein a position of the binary significant value within the address is determined by a hierarchical level of the given row.

19. The method according to claim 14, wherein each of the selectors is coupled to store the request-to-read signal until receipt by the selector of the select signal.

20. The method according to claim 14, wherein a given selector chosen from the selectors is coupled to receive and store a first request-to-read signal from a first detector unit chosen from the detector units, and to receive and store a second request-to-read signal from a second detector unit chosen from the detector units.

21. The method according to claim 20, wherein the given selector stores the first request-to-read signal until receipt by the given selector of the select signal.

22. The method according to claim 21, wherein the given selector stores the second request-to-read signal until receipt by the given selector of a subsequent select signal.

23. The method according to claim 14, wherein the plurality of selectors are coupled to receive and store two or more request-to-read signals from respective two or more detector units having respective two or more indications stored therein.

24. The method according to claim 23, and comprising receiving the two or more request-to-read signals and in response transmitting respective two or more select signals via the plurality of selectors to the respective two or more detector units, thereby causing reading of the respective two or more indications.

25. The method according to claim 14, wherein the plurality of selectors are configured to assign a priority to the request-to-read signal.

26. The method according to claim 25, wherein the priority is operative so that if a first detector unit issues a first request-to-read signal in an initial time period, and a second detector unit and the first detector unit issue respective second request-to-read signals in a later time period, the plurality of selectors direct the select signals so that in the later time period the second detector unit is read before the first detector unit.

* * * * *